United States Patent [19]
Messenger

[11] Patent Number: 5,101,406
[45] Date of Patent: Mar. 31, 1992

[54] WIRELESS COMMUNICATIONS SYSTEM

[75] Inventor: Steven Messenger, Scarborough, Canada

[73] Assignee: Telesystems SLW Inc., Don Mills, Canada

[21] Appl. No.: 398,928

[22] Filed: Aug. 28, 1989

[51] Int. Cl.$^5$ ............... H04J 3/24; H04J 3/16
[52] U.S. Cl. .................. 370/94.1; 370/95.1
[58] Field of Search ............ 370/94.1, 94.2, 94.3, 370/95.1, 95.3, 18; 375/1, 25, 26, 44, 45, 52; 455/1

[56] References Cited

U.S. PATENT DOCUMENTS

| | | | |
|---|---|---|---|
| 4,414,662 | 11/1983 | Bousquet | 370/18 |
| 4,470,138 | 9/1984 | Gutleber | 370/18 |
| 4,644,299 | 2/1987 | Amoroso et al. | 455/1 |

*Primary Examiner*—Douglas W. Olms
*Assistant Examiner*—Wellington Chin
*Attorney, Agent, or Firm*—Mirek A. Waraksa

[57] ABSTRACT

A wireless packet communication system is operable in a frequency band occupied by other transmission sources. The system includes a base station and several remote stations. Each remote station has a transceiver for transmitting and receiving data packets on electromagnetic carriers. The carrier frequency of the transceiver is selected in a pseudorandom manner from a predetermined set of carrier frequencies prior to transmission of each packet or in response to detection of transmission errors. Each carrier frequency may be associated with a unique pseudorandom noise code used to spread spectrum encode packets. The base station has a number of transceivers which operate simultaneously at the different carrier frequencies and which generate different noise codes for spread spectrum encoding and decoding. The base station records data for each remote station identifying the transceiver which last received a data packet and transmits packets addressed to each remote station with the identified transceiver.

7 Claims, 2 Drawing Sheets

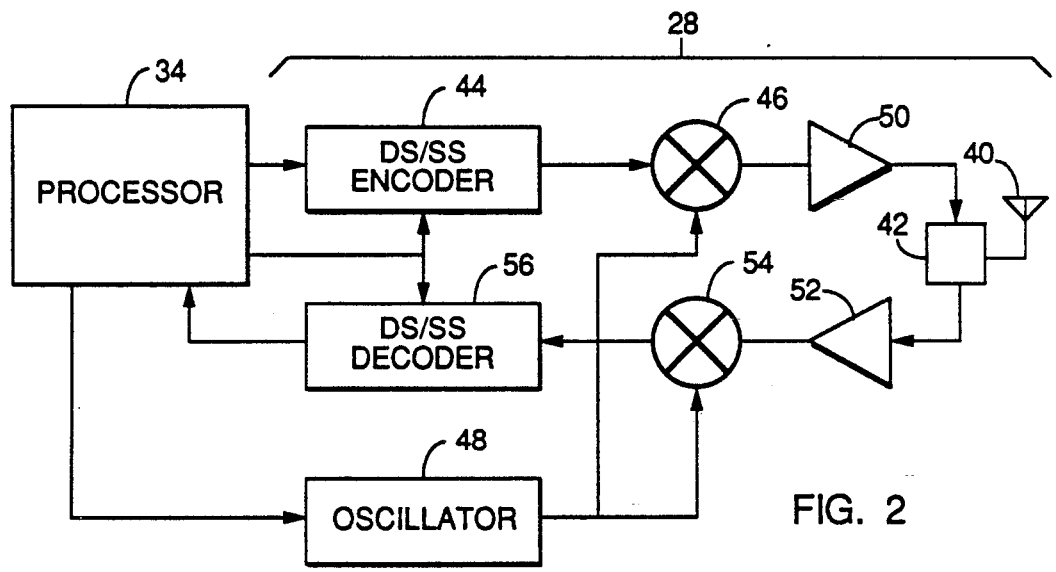
FIG. 2
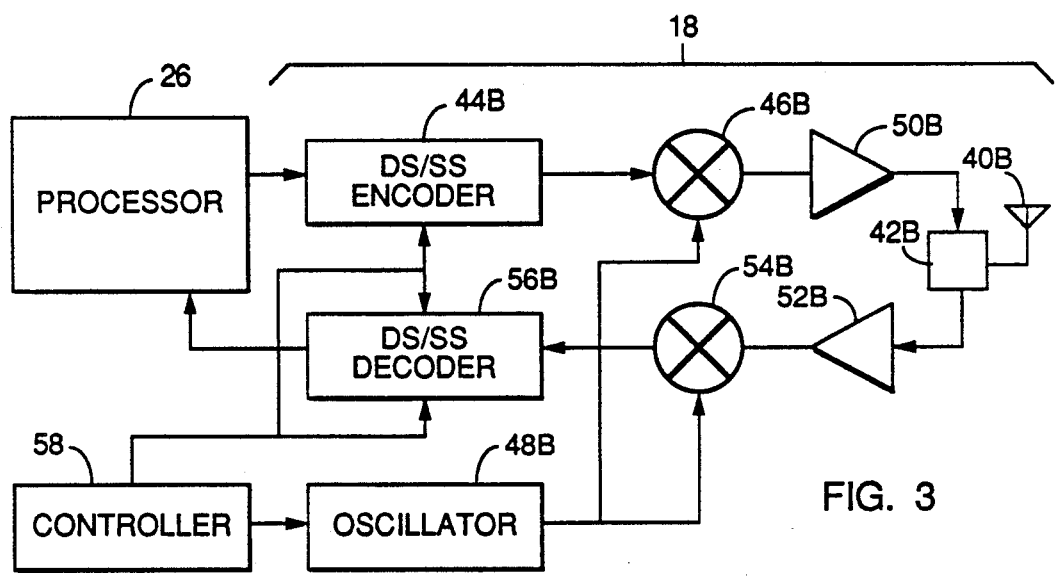
FIG. 3
| 12 | 24 |
| --- | --- |
| 14 | 18 |
| 16 | 20 |
FIG. 4

WIRELESS COMMUNICATIONS SYSTEM

FIELD OF THE INVENTION

The invention relates to wireless communication systems and more particularly to packet communication systems adapted to operate in a frequency band occupied by other transmission sources including sources which transmit at frequencies varying in a relatively unpredictable manner.

BACKGROUND OF THE INVENTION

In recent years there has been considerable emphasis on wireless transfer of data in packet form. Such data might typically be transferred between items of data processing equipment such as computers in a local area network or in connection with telephonic transmission of voice data. Systems embodying such communications are normally operated in a limited geographical area such as the confines of a building or among several buildings in close proximity. The problem which commonly arises in such systems is that one cannot preclude interference from other sources of electromagnetic radiation.

In some regions, a frequency band may not be dedicated to such communications. The band may be shared with other sources, both communication devices and sources of electromagnetic noise whose interference is sometimes unpredictable. One approach to reducing interference is to employ spread spectrum encoding and decoding of signals. This enhances noise rejection, but does not render a communication system immune to all other transmission sources. One particular problem relates to use of microwave appliances which may be operating in a nominal frequency band proximate to the frequency band of a communication system. The frequency of signals emanating from such an appliance can vary radically during operation, and such devices consequently tend to jam transmissions in a very aggressive manner.

BRIEF SUMMARY OF THE INVENTION

In one aspect, the invention provides a packet communication system comprising a base station and a plurality of remote stations. Each remote station includes means for selecting a different encoding algorithm at intervals from among a plurality of predetermined encoding algorithms. These algorithms are intended to encode data packets prior to wireless transmission and to permit subsequent separation of transmitted data packets from other communications and noise by means of complementary decoding techniques. Exemplary encoding algorithms include encoding of packets onto electromagnetic carriers of predetermined carrier frequencies, spread spectrum modulation and a combination of such techniques. Each remote station comprises means for transmitting data packets through air to the base station, including encoding means adapted to encode data packets according to any one of the predetermined encoding algorithms and controlled by the selecting means to encode each data packet transmitted to the base station according to the currently selected encoding algorithm. Means are provided for inserting into each data packet an indicator identifying the remote station. Each remote station comprises means for receiving data packets transmitted through air, including decoding means adapted to decode packets encoded according to any one of the predetermined encoding algorithms, the decoding means being controlled by the selecting means to decode any currently received data packet according to a decoding algorithm complementary to the currently selected encoding algorithm.

The base station comprises a plurality of receiving channels operating simultaneously to receive data packet transmitted through air to the base station. Each receiving channel comprises means for decoding received data packets according to a predetermined decoding algorithm, the decoding algorithm associated with each receiving channel being complementary to a different one of the predetermined encoding algorithms. Means cooperating with the receiving channels and responsive to indicators in data packets received by the receiving channels serve to record with respect to each remote station data identifying the encoding algorithm according to which a data packet last received from the remote station was encoded. Means are provided for transmitting data packets through air to the remote stations, the transmitting means of the base station comprising encoding means adapted to encode any data packet transmitted to the remote stations according to any one of the predetermined encoding algorithms and responsive to the recording means to encode any data packet addressed to any one of the remote stations according to the encoding algorithm identified by the data recorded with respect to the remote station.

In general terms, the encoding algorithms define a number of distinct communications channels, each channel being characterized by particular encoding techniques and complementary decoding techniques. Each remote station changes the communications channel it uses at intervals, which permits communications channels to be adopted which potentially avoid interference from other electromagnetic sources. The base station is adapted to receive and decode packets transmissions regardless what communication channel a remote station elects to use, and effectively determines from received transmissions what form of encoding is appropriate for transmission of data packets to any particular remote station. Error checking protocols and re-transmission of non-received packets, implicit in any packet transmission system, can accommodate the occasional loss of a packet.

Each remote station may change its currently selected encoding algorithm at intervals in a variety of ways. One preferred method involves changing the encoding algorithm to another in a pseudorandom manner prior to each transmission of a data packet from the remote station. This is particularly appropriate for accommodating aggressive jamming sources which are not confined to any particular spectral range. To that end, the encoding algorithms may involve encoding each data packet transmitted by the remote station onto different electromagnetic carrier frequencies, spread spectrum encoding the data packets with different pseudorandom noise codes (some characterized by higher processing gains thereby permitting greater likelihood of recovery of transmitted packets although lower data transfer rates) or other encoding techniques. Alternatively, the selection process may involve changing the encoding algorithm in response to errors in transmission of packets between the base station and the relevant remote station. Packet handling routines associated with packet communication systems will commonly have error checking routines, often based on a cyclic redundancy tests well known in the art. When a statistically unacceptable transmission error rate is observed, the remote station may then change its current encoding algorithm to another. This may be done by stepping in a predetermined manner through the various encoding algorithms recognized by the system or by pseudo-random selection.

The recording at the base station of the encoding algorithm associated with the packet last from a remote station may involve noting which of the receiving channels successfully decoded the transmission. That particular receiving channel is implicitly employing a decoding technique complementary to the currently selected encoding technique of the remote station. In an embodiment of the invention in which the receiving channels and transmitting means of the base station are combined as a plurality of transceivers each operating at a different carrier frequency, the recording process simply reduces to storing and updating data identifying which of the transceivers decoded the last packet received from any particular station. A packet intended for the particular remote station can thereafter be routed to the appropriate transceiver.

The encoding algorithms preferably comprise encoding packets onto electromagnetic carriers of different carrier frequencies and direct sequence spread spectrum encoding of the packets. A different pseudorandom noise codes may associated with each of the system's carrier frequencies. Some communications channels may be associated with lengthy noise codes which render communications along those channel less susceptible to interference from other electromagnetic sources while others may be associated with shorter PN codes that enhance data transfer rates although having lower processing gain and consequently greater susceptibility to interference from noise sources. The overall effect in such circumstances is to enhance general data transfer rates while maintaining more reliable transmission channels in the event that the system is exposed to a strong or aggressive noise source. The selection means of each remote station may also be adapted to switch at intervals to a predetermined communication channel characterized by a shorter noise code and to switch to an alternative channel in the event that statistically unacceptable transmission errors are detected.

Other aspects of the invention will be apparent from a description of a preferred embodiment below and will be defined in greater detail in the appended claims.

DESCRIPTION OF THE DRAWINGS

The invention will be better understood with reference to drawings in which:

FIG. 2 diagrammatically illustrates the general configuration of a transceiver used by a remote station of the system;

FIG. 3 diagrammatically illustrates the general configuration of a transceiver used by a base station of the system;

FIG. 4 diagrammatically illustrates a look-up table maintained by the base station.

DESCRIPTION OF PREFERRED EMBODIMENT

Figure 1:
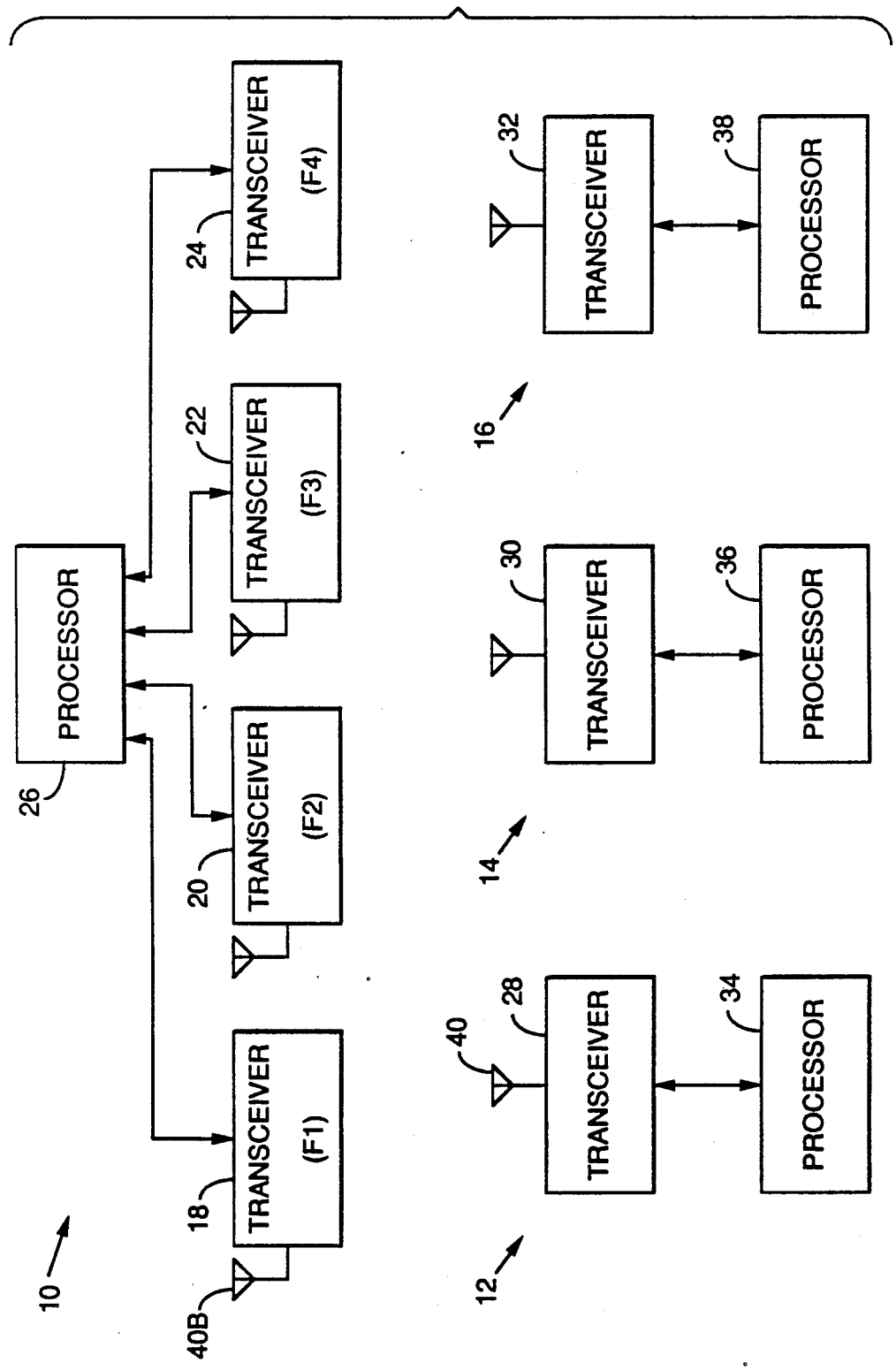
FIG. 1 is a diagrammatic representation of a communication system embodying the invention.

Reference is made to FIG. 1 which illustrates a wireless communication system involving packet transmission on electromagnetic carriers. The system comprises a base station 10 and three remote stations 12-16. The base station 10 might typically be stationary, but the remote stations 12-16 may be mobile or portable. The base station 10 may itself be coupled to system resources to be shared by the remote stations 12-16 such as a computer, communication services, mass storage units, and printers. In such circumstances, the remote stations 12-16 might be associated with data processing equipment such as personal computers or dumb terminals. Alternatively, or in conjunction with digital data transfer, the system may be used to transfer voice signals.

The base station 10 may be seen to comprise four transceivers 18-24. Each transceiver operates at a different one of four operating frequencies designated F1-F4, respectively. Each responds only to packets received on electromagnetic carrier of its operating frequency and also transmits packets only on electromagnetic carriers of its operating frequency. Each transceiver is adapted to direct sequence spread spectrum encode and decode data packets according to different pseudorandom noise codes designated herein as PN1-PN4. The noise codes correspond in number to the set of operating frequencies of the transceivers 18-24, and each pseudorandom noise code is uniquely associated with a different one of the set of operating frequencies. Four transceivers 18-24 have been shown, and in practice two or more transceivers might be used. The number of remote stations illustrated is not necessarily related to the number of base station transceivers and only three such remote stations have been illustrated for convenience.

The base station 10 includes a processor 26 which is appropriately programmed to perform a variety of functions related to packet assembly and disassembly. The processor 26 inserts into each packet prior to transmission a code identifying the base station 10 as the source of the packet. It also inserts a code identifying the particular remote stations to which the packet is addressed. It may also be adapted to discard duplicate packets or packets which are not addressed to the base station 10, the latter function being dependent on the exact configuration of the system. As well, the base station processor 26 may perform a cyclic redundancy test to determine whether a transmission error has occurred with respect to any packet received. In response successful receipt of a packet, the base station processor 26 will cause a packet acknowledging receipt to be transmitted to the source remote station. In response to a transmission error, the base station processor 26 will discard the received packet and transmit no acknowledgement. The remote station which was the source of the discarded packet will normally be adapted to retransmit the packet in response to the absence of an acknowledgement within a predetermined time frame. These functions are conventional in packet communication systems and their implementation will be readily apparent those skilled in the art. The processor 26 is coupled to each of the transceivers 18-24 such that the processor 26 can select any one of the transceivers 18-24 to transmit a packet to any particular one of the remote stations 12-16.

The remote stations 12-16 are associated with transceivers 28-32 and processors 34-38, respectively. The transceiver 28 and processor 34 of the remote station 12 are typical and are illustrated in FIG. 2. In general terms, the transceiver 28 transmits and receives packets on a selectable operating frequency. The operating frequency is selected by the processor 34 of the remote station 12 from among the four carrier frequencies recognized by the base station transceivers 18-24. The transceiver 28 is also adapted to direct sequence spread spectrum encode and decode packets using the various pseudorandom noise codes PN1-PN4 associated with the base station transceivers 18-24. At any given time, the transceiver 28 will use the pseudorandom noise code associated with its current operating frequency for such purposes. Accordingly, one of the base station transceivers 18-24 will at any time be capable of receiving and decoding the packets transmitted by the remote station transceiver 28.

The remote station processor 34 will be appropriately programmed to perform general packet assembling and disassembling functions analogous to those of the base station processor 26. One general function which is particularly significant to the present invention is the insertion of codes, or more generally indicators, into each packet transmitted by the remote station 12 identifying the remote station 12 as the source of the packet. This is quite common in packet transmissions, but in the present invention serves to assist the base station 10 in associating one of its transceivers 18-24 for use in transmitting packets to the remote station 12, as explained more fully below.

The transceiver 28 associated with remote station 12 has an antenna 40 which is used both to transmit and receive data packets, and a junction 42 which couples the antenna 40 to transmission and receiving channels. In a transmission mode, serial bits of a data packet are supplied by the processor 34 to a direct sequence spread spectrum (DS/SS) encoder 44. The encoder 44 generates a pseudorandom noise code and combines the data bits with the pseudorandom noise code to produce a wide-band spread spectrum signal. (The encoder 44 may also comprise circuitry to perform a differential phase shift encoding of the data bits prior to direct sequence spread spectrum encoding). The wide-band signal is then encoded by a balanced mixer 46 onto an electromagnetic carrier whose frequency is determined by a local oscillator 48. The signal produced by the balanced mixer 46 is amplified by an amplifier 50 and transmitted by the antenna 40.

Both the oscillator 48 and the encoder 44 are controlled by the processor 34 of the remote station 12. In this embodiment, the processor 34 is programmed to select the frequency of the oscillator 48 in a pseudorandom fashion from the set of carrier frequencies recognized by the base station transceivers 18-24. The change is made prior to each transmission of a packet by the remote station 12. The processor 34 concurrently sets the pseudorandom noise code generated by the encoder 44 to the pseudorandom noise code recognized by the base station transceiver responsive to the currently selected operating frequency of the remote station 12.

In the receiving mode, the transceiver 28 simply awaits response packets from the base station 10 which are expected to be received on an electromagnetic carrier whose frequency corresponds to the current operating frequency of the remote station 12 and which are expected to be direct sequence spread spectrum encoded with the corresponding pseudorandom noise code. The packet as received by the antenna 40 is amplified and filtered by an amplifier/filter 52. A balanced mixer 54 combines the incoming packet with the signal generated by the local oscillator 48 (namely, the current operating frequency of the remote station 12) to demodulate the packet from its electromagnetic carrier. The signal produced by the balanced mixer 54 is received by a DS/SS decoder 56 which generates the current pseudorandom noise code of the station and combines the pseudorandom noise code with the received data packet to spread spectrum decode the contained data. The decoder 56 may be associated with a filter which removes undesired signals, in a conventional manner. The decoder 56 is controlled by the processor 34 of the remote station 12 to generate and use the pseudorandom noise code corresponding to the current operating frequency of the remote station 12 for such purposes. This decoding will normally involve selecting an appropriate phase angle for the pseudorandom noise code which synchronizes the pseudorandom noise code with the receiving data packet. (A subsequent processing step may involve differential phase shift demodulation of the narrow-band signal produced by spread spectrum demodulation.) Serial bits of the decoded data packets are then received by the remote station processor 34 which performs the customary packet handling functions including transmission error checking and discarding of packets not addressed to the remote station 12.

The encoding and decoding processes are conventional. Although the encoder 44 and decoder 56 of the remote station 12 are indicated as separately generating the currently required pseudorandom noise code of the remote station 12, this is not necessary and a single shared code generator can be used. An exemplary implementation can be obtained from U.S. Pat. No. 4,774,715 to Messenger, which is incorporated herein by reference, except that the code generator provided must be programmable to generate the various noise codes required by the communications system.

The transceiver 18 of the base station 10, which is exemplary of the four base station transceivers 18-24, is illustrated in FIG. 3. The configuration and operation of the transceiver 18 is similar to that of the remote station transceiver 28. Components common to the transceivers 18,28 have consequently been labelled in FIG. 3 with the same reference numerals used in FIG. 2 followed by the letter "B". The operation of such components will be apparent from the foregoing description of the transceiver 28. The operating frequency F1 and the pseudorandom noise code PN1 of the transceiver 18 may, however, be set during initial configuration of the system and may remain unchanged in normal operation. To that end, a controller 58 is provided which permits setting of the operating frequency of the oscillator 48 and the pseudorandom noise code of the encoder 44B and decoder 56B of the base station 10.

General operation will be described with respect to the remote station 12. It is assumed in this embodiment of the invention that the remote station 12 can initiate packet transmission to the base station 10 and that the base station 10 will retransmit any data which must be transferred between the remote station 12 and any other remote station. Various known techniques can be used to avoid conflicting transmission of packets by the remote stations and to resolve any conflicts which may in fact occur.

The station may initially transmit a packet on the predetermined carrier frequency F4 and encode the packet according to the pseudorandom noise code PN4 associated with the carrier frequency F4. The packet is received and decoded by the base station transceiver 24 which operates at the carrier frequency F4 and which generates the pseudorandom noise code PN4 required to decode the remote station packet. The base station processor 26 identifies the transceiver 24 according to the transmission line on which the packet is detected, identifies the remote station 12 as the source of the packet by detecting the code of the remote station 12 in the decoded packet, and records in a random access memory associated with the processor 34 data identifying the transceiver 24 as the transceiver 24 which last received a packet from the remote station 12. The processor 26 may maintain a look-up table (substantially as diagrammatically illustrated in FIG. 4) in the memory associated with the processor 26. The look-up table may contain a plurality of records (horizontal rows) corresponding to the number of remote stations 12-16. Each record may include the identification code commonly used by the remote station (left-most field) to identify its packets (more generally a code identifying the remote station 12 in the system), and a code identifying which of the base station transceivers 18-24 last received a data packet from the particular remote station (right-most field). In FIG. 4, the identification codes for the remote stations and the transceivers have been represented by the reference characters otherwise used in the drawings. In this embodiment, the base station processor 26 may simply re-write the transceiver identification code associated with the record associated with the remote station 12 to arrive at the entries shown in FIG. 4.

The base station 10 may thereafter transmit a packet to the remote station 12 containing, for example, computing data or voice data intended for the remote station. Before transmission, the processor 26 scans the look-up table to identify the entry containing the address code of the remote station 12 and retrieves the data identifying the transceiver 24 as the transceiver currently required to transmit packets to the remote station 12. In effect, the data identifies the frequency F4 as the appropriate transmission frequency for packets to be sent to the remote station 12 and the associated PN code required for spread spectrum encoding. The base station 10 may then address a packet to the remote station 12 and transmit the packet through the transceiver 24 on the carrier frequency F4 and then coded with the corresponding pseudorandom noise code PN4. The remote station 12 awaits any base station packet which is expected to be received at the current operating frequency F4 of the remote station 12. The transceiver 28 of the remote station 12 then simply demodulates and direct sequence spread spectrum decodes the packet using the pseudorandom noise code PN4.

Immediately prior to the transmission of another packet, the remote station processor 34 selects at random another of the four predetermined frequencies, assumed, for example, to be F2. The processor 34 then sets the oscillator 48 associated with the transceiver 28 to the frequency F2. It also sets the encoder and decoder 44, 56 to produce the corresponding pseudorandom noise code PN2. The next packet of the remote station 12 is then appropriately direct sequence spread spectrum encoded and transmitted to the base station 10 on an electromagnetic carrier whose frequency corresponds to F2. The base station transceiver 20 receives and decodes the packet. The base station processor 26 then updates its look-up table, recording data identifying the transceiver 20 for transmission of further packets to the remote station 12.

The process described above may be repeated with further transmissions between the base station 10 and the remote station 12. The description of operation has been simplified, and it is fully expected that others of the remote stations 12-16 may be transmitting and receiving packets between packet transmissions from the base station 10 to and from the remote station 12. As well, error checking protocols may be invoked which require re-transmission of packets from either the remote station 12 or the base station 10. Any re-transmission of a data packet by the remote station 12 will in this embodiment of the invention involve a change in the operating frequency of the remote station 12.

The random changing of the operating frequency of the remote station 12 tends to overcome continued interference by other electromagnetic sources. Packets may ocasionally be lost owing to the presence of such sources. If the noise source is producing electromagnetic radiation in a frequency band proximate to or overlapping one of the four transmission frequencies, then every packet transmitted at that system frequency may potentially be lost. If the source is characterized by a varying spectral content, as might be the case with a microwave appliance, then packets may be occasionally lost at various system carrier frequencies and in a less predictable manner. Error checking protocols and attendant re-transmission at different random operating frequencies accommodates such problems.

The algorithm for selecting operating frequencies is preferably pseudorandom and preferably involves selection of a new operating frequency at each remote station prior to transmission of each remote station packet. This is believed to be the most effective manner to avoid undue interference from an aggressive jamming source such as a microwave appliance. However, the remote station would normally be programmed as discussed above to perform transmission error checking. Accordingly, the remote station may be appropriately programmed to change its current operating frequency in response to transmission errors. The changing of the operating frequency in response to transmission errors is preferably done in a pseudorandom manner to avoid the possibility that all remote system stations will be transmitting on a single frequency, such a condition enhancing the likelihood of conflicting transmissions. It is desirable in such circumstances for the remote station processor 34 to be programmed to recognize a statistically acceptable error rate, such as loss of one packet in ten transmissions, and to change its operating frequency only when a statistically unacceptable error rate occurs. Given current practices regarding error checking, the appropriate programming of the processor 34 will be readily apparent.

The communications channels embodied in the system may be may involve noise codes of different lengths. For example, the code PN1 may be relatively short (characterized by low processing gain but higher data transfer rates), and the code PN2 may be relatively long (characterized by high processing gain but lower data transfer rates). The processor 34 of the remote station 12 may be adapted by appropriate programming to periodically switch its encoding algorithm to use of the carrier frequency F1 and code PN1 with a view to enhancing data transfer rates. The processor 34 may be appropriately programmed to detect the number of successful packet transmission between successive transmission error (errors being recognized by absence of base station packets acknowledging receipt of remote station packets). In response to a statistically unacceptable transmission error rate, for example, less than 10 successful transmissions between transmission failures, the processor 34 may then switch to an alternative communications channel such as the channel characterized by the carrier frequency F2 and relatively long noise code PN2 to obtain more reliable transmission. This arrangement will tend generally to enhance data transfer rates while ensuring that a relatively robust communications channel is accessible in the event that the system is subjected to severe noise problems. This type of operation in connection with spread spectrum encoding of packets need not involve different carrier frequencies: a single common carrier frequency might be used for all packet transmission with communication channels being differentiated by use of different noise codes. Alternatively, multiple carrier frequencies may be used and one or more of the carrier frequencies may be associated with noise codes of different lengths.

It will be appreciated that a particular embodiment of the invention has been described and particular alternatives and that further modifications may be made without necessarily departing from the scope of the appended claims.

I claim:

1. A packet communication system comprising:
   a base station;
   a plurality of remote stations;
   each of the remote stations comprising
   (a) means for selecting a different encoding algorithm at intervals from among a plurality of predetermined encoding algorithms,
   (b) means for transmitting data packets through air to the base station, the transmitting means comprising encoding means adapted to encode data packets according to any one of the predetermined encoding algorithms and controlled by the selecting means to encode each data packet transmitted to the base station according to the currently selected encoding algorithm,
   (c) means for inserting into each data packet transmitted from the remote station an indicator identifying the remote station, and
   (d) means for receiving data packets transmitted through air to the remote station, the receiving means comprising decoding means adapted to decode packets encoded according to any one of the predetermined encoding algorithms and controlled by the selecting means to decode any currently received data packet according to a decoding algorithm complementary to the currently selected encoding algorithm;
   the base station comprising
   (e) means defining a plurality of receiving channels operating simultaneously to receive any data packet transmitted through air to the base station, each receiving channel comprising means for decoding received data packets according to a predetermined decoding algorithm, the decoding algorithm associated with each receiving channel being complementary to a different one of the predetermined encoding algorithms,
   (f) means cooperating with the receiving channels and responsive to indicators in data packets received by the receiving channels for recording with respect to each of the remote stations data identifying the encoding algorithm according to which a data packet last received from the remote station was encoded, and
   (g) means for transmitting data packets through air to the remote stations, the transmitting means of the base station comprising encoding means adapted to encode any data packet transmitted to the remote stations according to any one of the predetermined encoding algorithms and responsive to the recording means to encode any data packet addressed to any particular one of the remote stations according to the encoding algorithm identified by the data recorded with respect to the particular remote station.

2. The packet communication system of claim 1 in which the selection means of each of the remote stations are adapted to select an encoding algorithm from among the predetermined encoding algorithms in a pseudorandom manner prior to transmission of each data packet transmitted from the remote station associated with the selection means.

3. The packet communication system of claim 1 in which:
   each of the remote stations comprises means for detecting errors in transmission of data packets between the remote station and the base station;
   the selection means of each of the remote stations are adapted to change the currently selected encoding algorithm to another of the predetermined encoding algorithms in response to detection of the transmission errors by the detecting means of the associated remote station.

4. The packet communication system of claim 1 in which the encoding means of the base station and of each of the remote stations are adapted to encode data packets onto electromagnetic carriers and in which each of the predetermined encoding algorithms is associated with a different predetermined carrier frequency.

5. The packet communication system of claim 4 in which the encoding means of the base station and of each of the remote stations are adapted to spread spectrum encode data packets by combining the packets with pseudorandom noise codes, and each of the predetermined encoding algorithms comprises spread spectrum encoding data packets with a different one of a plurality of predetermined pseudorandom noise codes prior to encoding onto an electromagnetic carrier.

6. The packet communication system of claim 5 in which:
   the encoding means of each of the remote stations comprise means for generating any one of the plurality of predetermined pseudorandom noise codes, each of the pseudorandom noise codes corresponding to a different one of the predetermined carrier frequencies, and comprise means for direct sequence spread spectrum encoding each data packet transmitted by the remote station with the pseudorandom noise code corresponding to the carrier frequency of the currently selected encoding algorithm of the remote station;
   the encoding means of the base station comprise means for generating any one of the plurality of predetermined pseudorandom noise codes and comprise means for direct sequence spread spectrum encoding each data packet transmitted by the base station with the pseudorandom noise code corresponding to the frequency of the electromagnetic carrier onto which the data packet is encoded by the encoding means of the base station;
   the decoding means of each of the remote stations comprise means for direct sequence spread spectrum decoding data packets with the pseudorandom noise code corresponding to the carrier frequency of the currently selected encoding algorithm of the remote station;

each of the decoding means of the receiving channels of the base station decode received packets encoded onto a different one of the predetermined carrier frequencies and comprise means for direct sequence spread spectrum decoding data packets with the pseudorandom noise code corresponding to the different one of the carrier frequencies.

7. The packet communication system of claim 1 in which:

the encoding means of the base station and of each of the remote stations are adapted to spread spectrum encode data packets by combining the data packets with pseudorandom noise codes;

each of the predetermined encoding algorithms comprises direct sequence spread spectrum encoding data packets by combining the packets with a different predetermined pseudorandom noise code that is associated with the encoding algorithm, the predetermined pseudorandom noise codes associated with at least one of the predetermined encoding algorithms being shorter than the pseudorandom noise code associated with another of the predetermined encoding algorithms;

each of the remote stations comprises means for detecting errors in transmission of data packets between the remote station and the base station;

the selection means of each of the remote stations are adapted at intervals to select one of the predetermined encoding algorithms associated with a relatively short pseudorandom noise code and thereafter to select another of the predetermined algorithms associated with a relatively lone pseudorandom noise code in response to detection of transmission errors.

* * * * *